US010994833B2

(12) United States Patent
Harris

(10) Patent No.: US 10,994,833 B2
(45) Date of Patent: May 4, 2021

(54) HEAVY-LIFT UNMANNED AERIAL VEHICLE LANDING GEAR SYSTEM

(71) Applicant: Benjamin Harris, Casselberry, FL (US)

(72) Inventor: Benjamin Harris, Casselberry, FL (US)

(73) Assignee: Harris Aerial LLC, Casselberry, FL (US)

(*) Notice: Subject to any disclaimer, the term of this patent is extended or adjusted under 35 U.S.C. 154(b) by 288 days.

(21) Appl. No.: 16/104,723

(22) Filed: Aug. 17, 2018

(65) Prior Publication Data

US 2018/0370618 A1 Dec. 27, 2018

Related U.S. Application Data

(63) Continuation-in-part of application No. 15/265,948, filed on Sep. 15, 2016, now Pat. No. 10,266,245.

(60) Provisional application No. 62/318,918, filed on Apr. 6, 2016.

(51) Int. Cl.
*B64C 25/12* (2006.01)
*B64C 25/24* (2006.01)
*B64C 25/22* (2006.01)
*B64C 39/02* (2006.01)
*B64F 5/50* (2017.01)

(52) U.S. Cl.
CPC .............. *B64C 25/12* (2013.01); *B64C 25/22* (2013.01); *B64C 25/24* (2013.01); *B64C 39/024* (2013.01); *B64F 5/50* (2017.01); *B64C 2201/024* (2013.01); *B64C 2201/027* (2013.01); *B64C 2201/128* (2013.01); *B64C 2201/18* (2013.01)

(58) Field of Classification Search
CPC ......... B64C 25/20; B64C 25/22; B64C 25/24; B64C 25/12; B64C 2201/024; B64C 2201/027; B64C 2201/128; B64C 2201/18
See application file for complete search history.

(56) References Cited

U.S. PATENT DOCUMENTS

| 7,979,960 B2 | 7/2011 | Sano et al. |
| 2012/0083945 A1 | 4/2012 | Oakley et al. |
| 2013/0193269 A1 | 8/2013 | Zwaan et al. |
| 2014/0217230 A1* | 8/2014 | Helou, Jr. ............. B64C 39/024 244/17.17 |
| 2015/0259066 A1 | 9/2015 | Johannesson et al. |
| 2015/0321755 A1 | 11/2015 | Martin et al. |
| 2015/0321758 A1 | 11/2015 | Peter |

(Continued)

*Primary Examiner* — Philip J Bonzell
*Assistant Examiner* — Tye William Abell
(74) *Attorney, Agent, or Firm* — Jason T. Daniel, Esq.; Daniel Law Offices, P.A.

(57) ABSTRACT

A landing system for a heavy-lift unmanned aerial vehicle includes an elongated main body that is constructed from a rigid material. The main body includes a central aperture and plurality of connectors for engaging complementary connectors located on the bottom of an unmanned aerial vehicle. A pair of landing units that are positioned along two sides of the main body via connection assemblies which transition the landing units between an extended and retracted orientation. A pair of electromechanical actuators are positioned along the main body at locations adjacent to the landing units. The actuators can include linear motors that are offset from the landing unit connection assemblies. The actuators are coupled to the control and power units of an attached unmanned aerial vehicle.

16 Claims, 6 Drawing Sheets

(56) References Cited

U.S. PATENT DOCUMENTS

| | | |
|---|---|---|
| 2016/0122016 A1 | 5/2016 | Mintchev et al. |
| 2016/0152316 A1 | 6/2016 | Wang et al. |
| 2016/0167776 A1 | 6/2016 | Shaw |
| 2016/0325834 A1 | 11/2016 | Foster |
| 2016/0339789 A1 | 11/2016 | Wang et al. |
| 2016/0376004 A1 | 12/2016 | Claridge et al. |
| 2017/0085840 A1 | 3/2017 | Mizushina et al. |
| 2017/0158328 A1 | 6/2017 | Foley |
| 2017/0183074 A1 | 6/2017 | Hutson et al. |
| 2017/0203843 A1 | 7/2017 | Chan et al. |
| 2017/0253324 A1* | 9/2017 | Zhao ................. B64C 25/10 |
| 2017/0267334 A1 | 9/2017 | Tsai |
| 2018/0002023 A1 | 1/2018 | Tian et al. |
| 2018/0016027 A1 | 1/2018 | Cheatham et al. |
| 2018/0352170 A1* | 12/2018 | Zhao ................. H04N 7/185 |

\* cited by examiner

HEAVY-LIFT UNMANNED AERIAL VEHICLE LANDING GEAR SYSTEM

CROSS-REFERENCE TO RELATED APPLICATIONS

This application claims the benefit of U.S. application Ser. No. 62/318,918 filed on Apr. 6, 2016, and copending U.S. application Ser. No. 15/265,948, filed on Sep. 15, 2016, the contents of each of which are incorporated herein by reference.

TECHNICAL FIELD

The present invention relates generally to aerial vehicles, and more particularly to landing gear system for use with heavy-lift unmanned aerial vehicles.

BACKGROUND

The statements in this section merely provide background information related to the present disclosure and may not constitute prior art.

An Unmanned Aerial Vehicle (UAV) is a heavier-than-air flying machine that does not carry a human operator. UAV's are remotely operated, and are utilized for many different military and civilian applications such as reconnaissance, surveillance, area mapping, and/or photography, for example. As described throughout this document, a "small UAV" is described as any unmanned aerial vehicle having a total footprint of less than 6 feet in diameter, and a total unit weight of less than 60 pounds.

Traditionally, the use and implementation of small vertical takeoff and landing UAV's was limited to hobbyists, owing to the lightweight construction and minimum engine/lifting capacity of the same. However, recent advancements in micro engine technology have seen the introduction of small UAV's capable of lifting 30-70 pounds of equipment, for prolonged periods of time. As such, small UAV's are now being contemplated for use in new industries, such as lifting and transporting payloads from one location to another.

Although current UAV engine and control systems are capable of performing sustained heavy-lift (e.g., payloads over 25 pounds) operations, the outdated designs for UAV landing gear are not. For example, background FIG. 1 illustrates the most commonly utilized retractable landing gear system 1 for use with small UAV's. As shown, the gear includes a UAV, and a pair of elongated skids 3 that extend downward from each end of the bracket. In order for the skids to retract, a pair of rotational servos 4 are positioned directly between the bracket and skids.

As shown, the location of the servos 4 is directly in-line with the downward force F of the craft during landing. As such, when utilized for heavy-lift operations, the high weight and associated impact forces encountered during landing often result in a structural failure of one or both of the servos. In some instances, these failures have caused one or both of the skids to collapse, thereby resulting in damage and/or loss of the UAV and its cargo.

The present invention directed to modular landing gear for heavy-lift unmanned aerial vehicles differs from the conventional art in a number of aspects. The manner by which will become more apparent in the description which follows, particularly when read in conjunction with the accompanying drawings.

SUMMARY OF THE INVENTION

The present invention is directed to a landing system for a heavy-lift unmanned aerial vehicle. One embodiment of the present invention can include an elongated main body that is constructed from a rigid material and having a central aperture. The main body includes a plurality of connectors for engaging complementary connectors located on the bottom of an unmanned aerial vehicle, and a pair of landing units that are positioned along two sides of the main body.

The landing units are pivotally connected to the main body so as to transition between an extended orientation for use during setup and landing, and a retracted orientation wherein the distal portions of the landing units are rotated away from the main body. A pair of electromechanical actuators are positioned along the main body at locations adjacent to the landing units. The actuators can include linear motors that are offset from the landing unit connection assemblies. The actuators are coupled to the control and power units of an attached unmanned aerial vehicle.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
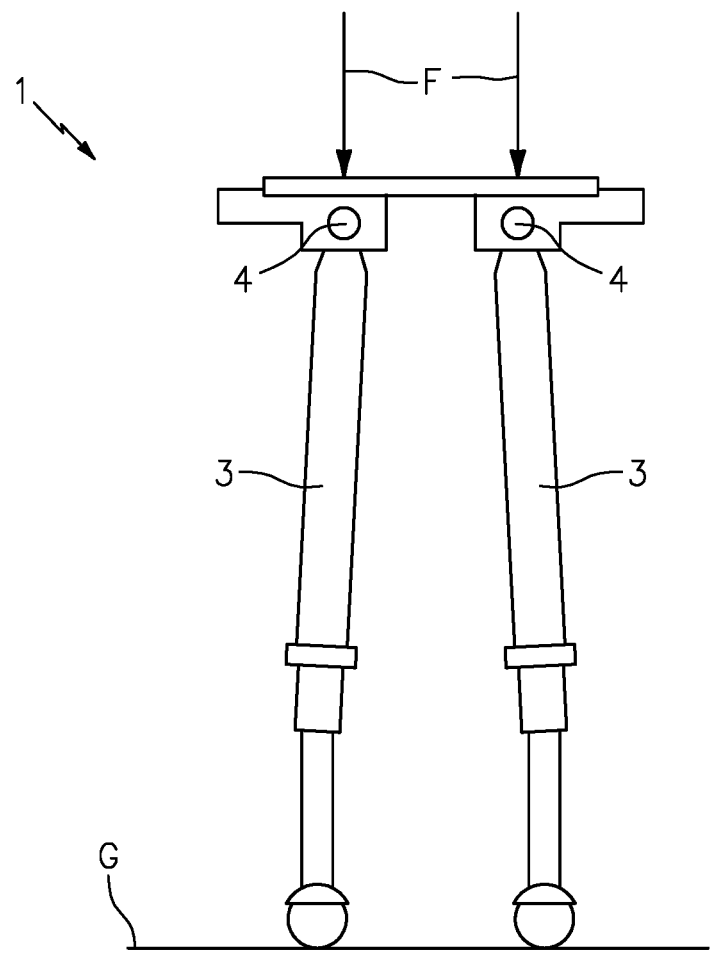
FIG. 1 is front view of a unmanned aerial vehicle landing gear, in accordance with background art.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "complementary dimension," shall be used to describe a situation wherein a object includes a size that is identical to, or substantially identical to the size of another component, in terms of length, and/or width, and/or height, for example.

As described herein, the term "removably secured," "removably engaged" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example.

As described herein, a "connector" can include any number of different elements capable of securing two items together in either a permanent or a nonpermanent manner. Several nonlimiting examples of a nonpermanent connector include, for example, opposing strips of hook and loop material (i.e. Velcro®), magnetic elements, tethers such as straps and zip ties, as well as compression fittings such as screws, nuts, bolts and other such hardware. Several non-limiting examples of permanent connectors include adhesives such as glue and resin, welds and rivets, for example.

As described herein, the term "pivotally connected," and all derivatives shall be used to describe a situation wherein two or more objects are joined together in a manner that allows one or both of the objects to pivot and/or rotate about or in relation to the other object along one or more axes. Several nonlimiting examples of pivotal connectors include hinge mechanisms, pivoting couplers and/or swivel flanges, for example. Alternatively, or in conjunction with the above noted devices, the objects can be rotatably connected via a dual axis hinge capable of providing both rotational movement (e.g., yaw) and pivotal movement (e.g., along one plane/linear). One suitable dual axis hinge is described in U.S. Pat. No. 7,979,960, the contents of which are incorporated herein by reference.

Figure 2:
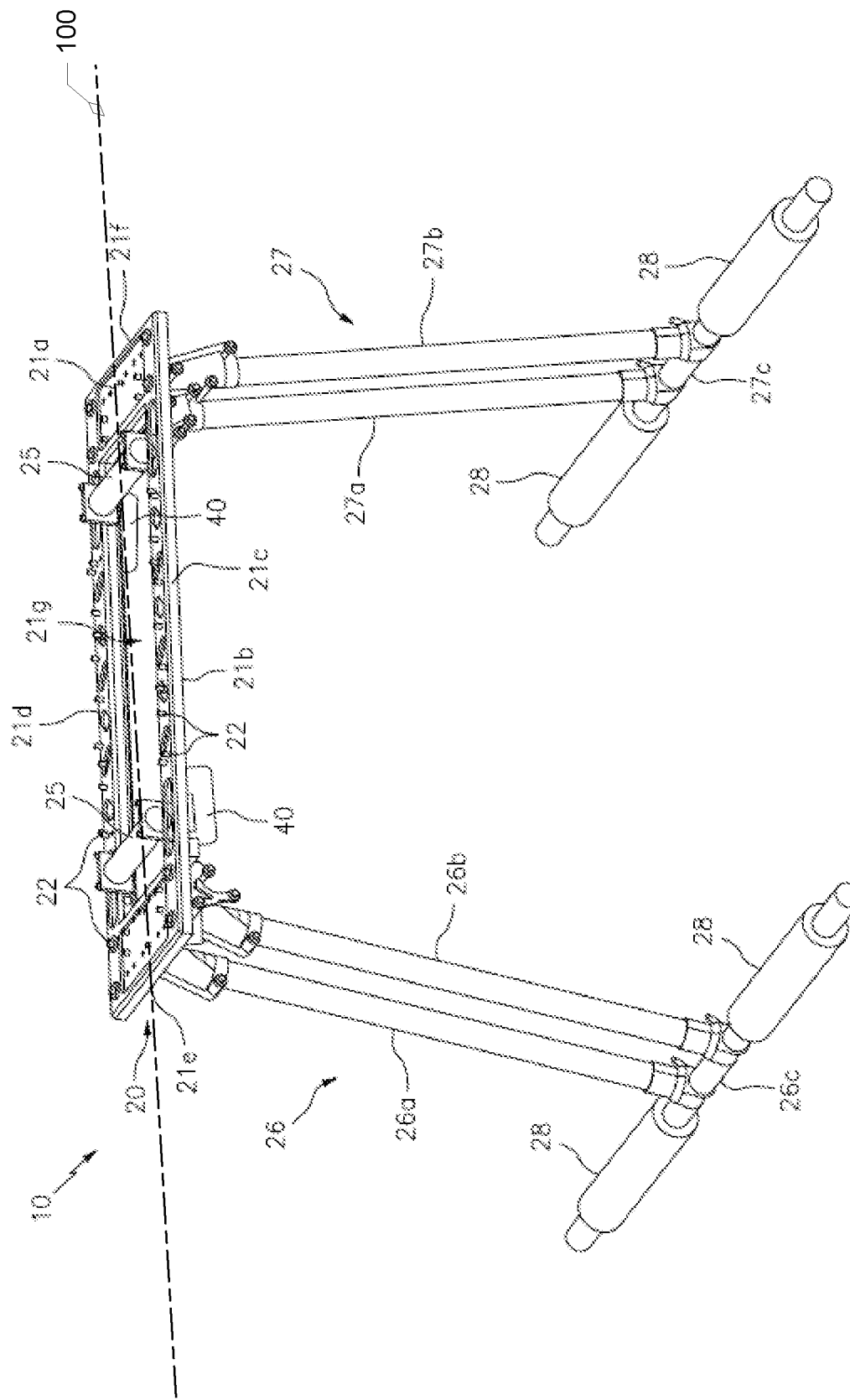
FIG. 2 is a perspective view of the landing gear system in the extended orientation, in accordance with one embodiment of the invention.

FIGS. 2-4 illustrate one embodiment of a heavy-lift UAV landing gear system 10, that includes an elongated main body 20 having a pair of landing units 26 and 27 that are connected to the main body via connection assemblies 30 and selectively operated by a pair of offset actuators 40. Throughout the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2.

As shown in FIG. 2, the system 10 can include a main body 20 having a generally rectangular-shaped member with a top surface 21a, a bottom surface 21b, a front surface 21c, a back surface 21d, and pair of opposing side surfaces 21e and 21f, that define an elongated central aperture 21g.

A plurality of connectors 22 can be disposed along the top surface of the main body for allowing the system to be coupled to the bottom of a heavy-lift UAV (See FIG. 4). Moreover, a pair of carrying handles 25 can be positioned across the central aperture 21g so as to extend between the front and rear surfaces 21c and 21d. In addition to aiding a user in carrying the landing system 10 and/or the system with an attached UAV, the location of the handles 25 are designed to provide torsional strength to main body 20 during operation of the landing gear. In this regard, each of the handles are positioned transverse to each of the below described offset linear actuators 40, and function to prevent deformation of the main body during device operation.

A pair of landing units 26 and 27 can be pivotally connected to the bottom end of the main body 20 at locations adjacent to sides 21e and 21f, respectively. The landing units can function to transition between an extended orientation for use during landing, and a retracted orientation for use during flight. As shown, each of the landing units can preferably include a pair of generally parallel-oriented struts 26a-26b and 27a-27b that are connected to elongated landing skids 26c and 27c, respectively. In various embodiments, a plurality of elongated hollow rollers 28 can be secured along the skids to facilitate movement of the device when mated with a UAV.

As described herein, the main body 20 and the landing units 26-27 may each be formed from materials that are, for example, lightweight and relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE) or polyethylene terephthalate (PET)), and/or various composite materials (e.g., carbon fibers in a polymer matrix, fiberglass, etc.). Of course, any number of other shapes and construction materials are also contemplated.

Figure 3A:
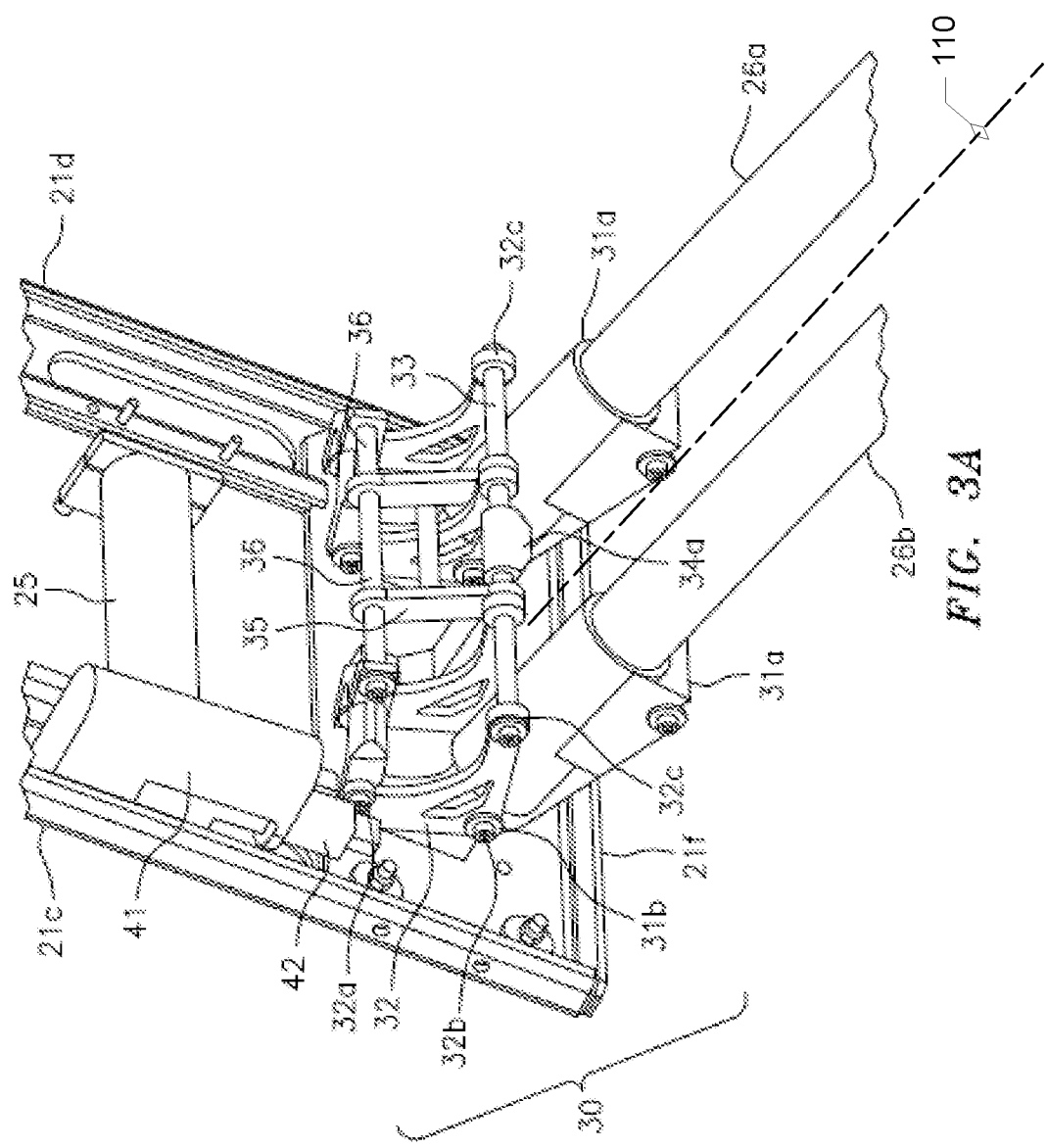
FIG. 3A is a bottom perspective view of one of the connection assemblies of the landing gear system in the extended orientation, in accordance with one embodiment of the invention.
Figure 3B:
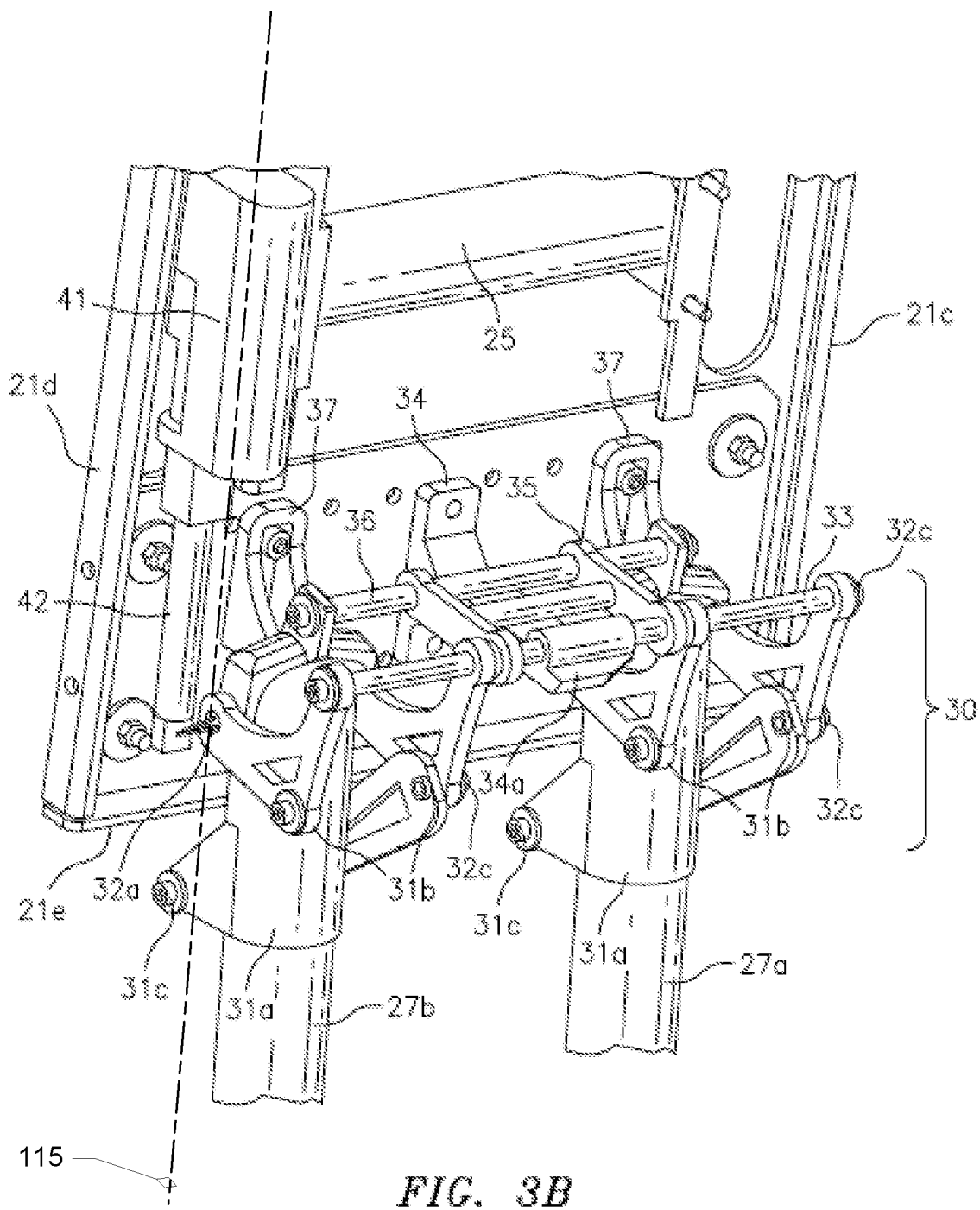
FIG. 3B is a bottom perspective view of one of the connection assemblies of the landing gear system in the retracted orientation, in accordance with one embodiment of the invention.

Although other types of pivotal connectors and/or connection assemblies are contemplated, FIGS. 3A and 3B illustrate a preferred embodiment that utilizes a pair of identical connection assemblies 30 to secure the landing units to the main body. In the illustrated embodiment, each of the connection assemblies can include a pair of strut receivers having a first end 31a for receiving the top of the landing struts, and a pair of second and third ends 31b and 31c. A pair of generally C-shaped joints 32 are secured to each of the strut receivers. Each of the C-shaped joints including a center portion 32b that is coupled to the second ends of the strut receivers 31b as shown.

A first connection shaft 33 is connected to the second end 32c of each of the C-shaped joints, and extends transversely between the strut receivers. A central bracket 34 is connected to the main body and is positioned midway between the pair of strut receivers. The bracket includes an opening 34a for receiving and supporting the central portion of the first shaft 33, while allowing rotation of the same. Frame member 35 connects the first shaft 33 to a second shaft 36 that is supported by brackets 37. Brackets 37 are secured to the bottom side of the main body on either side of the central bracket 34 and are also connected to the top end of the strut receivers.

The connection assemblies 30 are designed to receive a pushing and pulling force from an actuator that is not vertically stacked/positioned between the landing units and the main body (e.g., in an offset location). To this end, the system 10 can include a pair of electromechanical actuators 40 that are secured in line with a major axis 100 of the main body 20 along the bottom end thereof so as to be perpendicular to the major axis 110 of the connection assemblies 30.

Each of the actuators 40 can include a main housing 41 having a telescoping piston 42 that is connected to the first end of one of the C-shaped joints 32a. The actuators are positioned with their major axis 115 along the major axis 100 of the main body, so as to be perpendicular to the orientation of the landing units when the landing units are in the extend orientation, and generally parallel to the landing units when the landing units are in the retracted orientation.

As shown in FIG. 3A, when the piston 42 is in the retracted position, the C-shaped joint is manipulated so as to position the landing unit in the extended orientation. When in the extended orientation, each of the strut receivers, and associated landing struts are positioned perpendicular to the main body for use during landing.

Conversely, as shown in FIG. 3B, when the piston 42 is in the extended position, the C-shaped joint is manipulated so as to position the landing unit in the retracted orientation. When in the retracted orientation, each of the strut receivers are positioned parallel to the main body and the associated landing struts extend away from the main body.

One example of a suitable electromechanical actuator includes the P16-S Linear Actuator that is commercially available by Actuonix Motion Devices INC. Of course, any number of other such devices are contemplated. In either instance, the actuators can be electrically connected to the UAV so as to receive power and operating instructions therefrom.

Figure 4A:
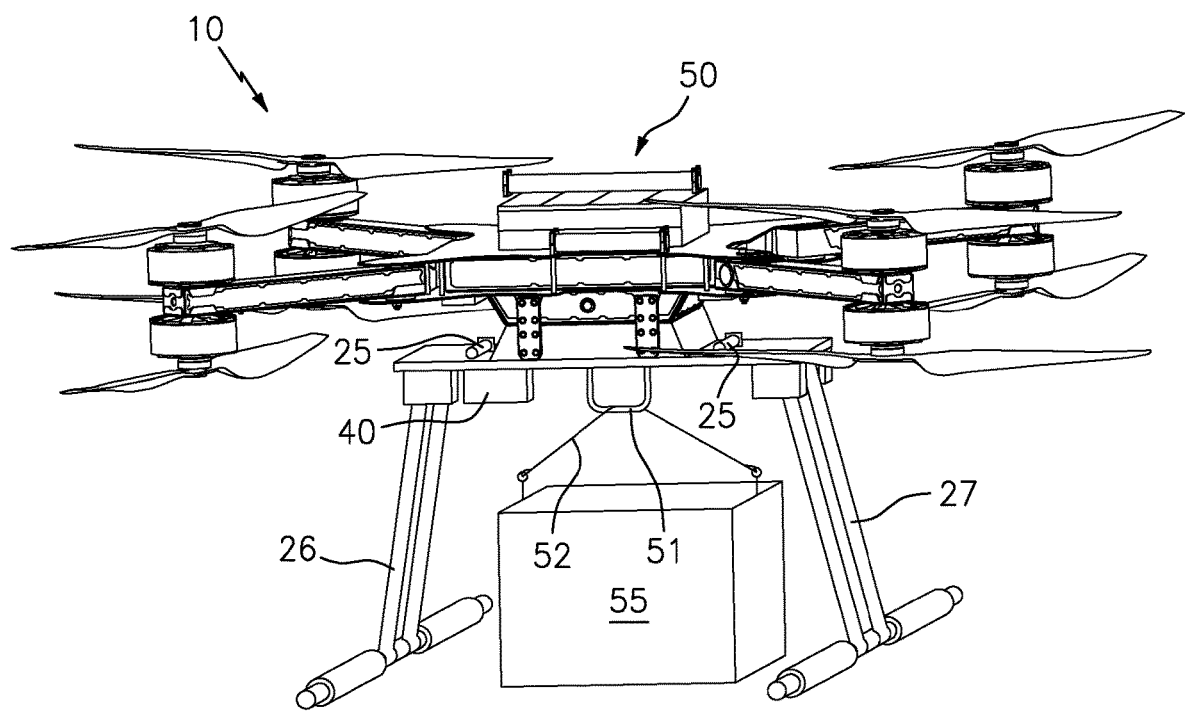
FIG. 4A is a perspective view of the landing gear system in operation, and in the extended orientation, in accordance with one embodiment of the invention.
Figure 4B:
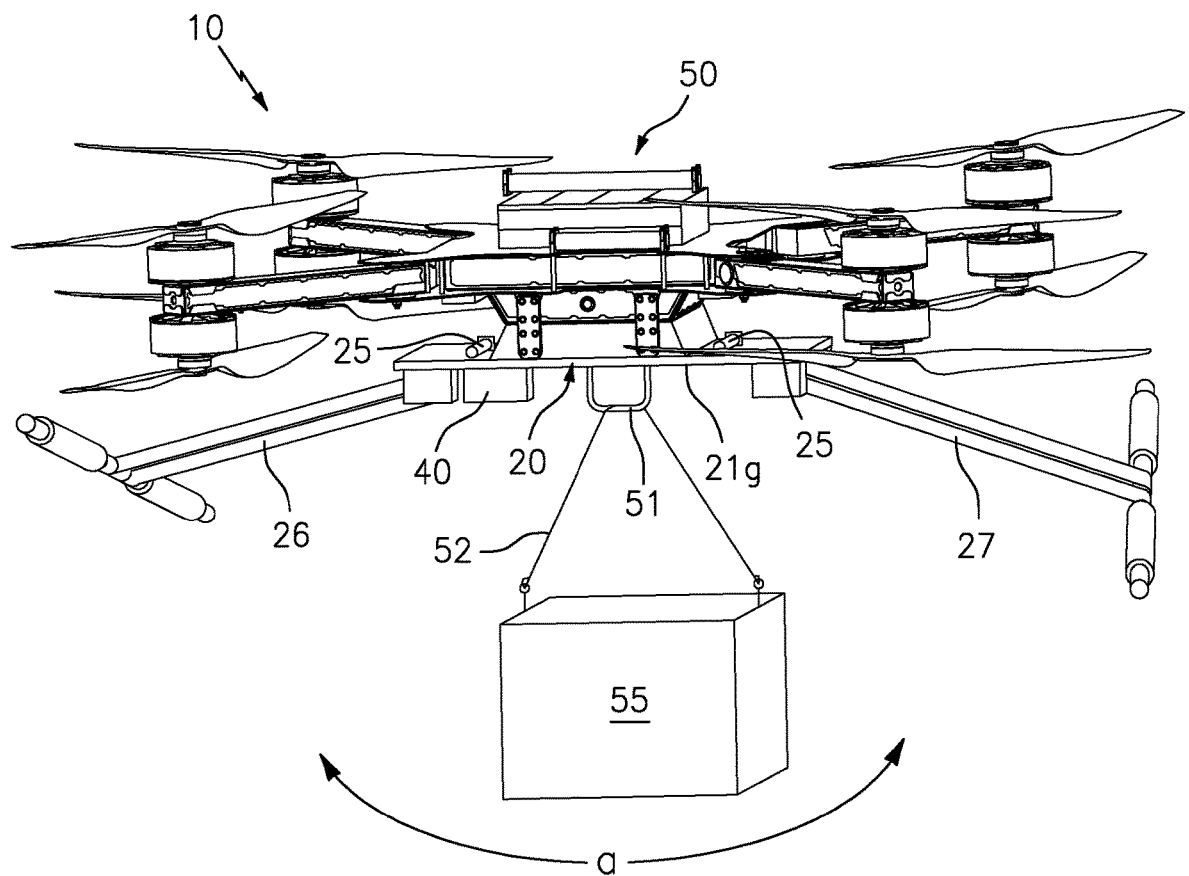
FIG. 4B is a perspective view of the landing gear system in operation, and in the retracted orientation, in accordance with one embodiment of the invention.

FIGS. 4A and 4B illustrate one embodiment of the landing gear system 10 in operation. As shown, the system can be secured to the bottom end of a heavy-lift UAV 50, such as the carrier HX8 system that is commercially available by Harris Aerial, for example. When so positioned, the central aperture 21g, which spans a majority of the length and width of the main body 20 allows unimpeded access to the bottom-center portion of the attached UAV. Such a feature is important, to accommodate the various shapes and sizes of belly hooks 51 and other such devices used by heavy-lift UAV's to secure cargo 55 thereto. As such, the central aperture ensures that the landing gear system 10 does not interfere with the use or operation of the UAV to lift or transport cargo.

To this end, when in the extended orientation shown in FIG. 4A, the landing system provides a stable platform onto which the UAV 50 can be secured prior to flight. At this time, a user can secure a cable 52 or other such device between the belly hook 51 and the cargo 55. Additionally, because the actuators 40 are offset from the landing units (e.g., are not vertically sandwiched between the landing units and the main body) violent impacts caused by landings and downward forces do not affect the actuators, as these forces are absorbed by the landing units and connection assemblies described above.

As shown in FIG. 4B, when the UAV 50 is in powered flight, the actuators 40 can transition the landing units 26 and 27 to the retracted position wherein the distal portions of the landing units extend away from the main body and cargo. As the cargo 55 has a tendency to sway (see arrow a) during flight, the orientation of the landing units advantageously prevents the cargo and/or associated tether 52 from becoming ensnared by the landing units, which can affect the flight characteristics of the UAV during flight.

While the dimensions of the elements are not critical, in the preferred embodiment the main body 20 can include a width of (e.g., distance between sides 21e-21f) of approximately 24 inches; a depth (e.g., distance between sides 21c-21d) of approximately 8 inches, and a height (e.g., distance between surfaces 21a-21b) of approximately 1 inch. Additionally, each of the landing unit struts can include a length of approximately 18 inches. Such dimensions being suitable for engaging the heavy lift UAV described above. Of course, other dimensions are also contemplated.

As described herein, one or more elements of the heavy-lift UAV landing system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A landing system for heavy-lift unmanned aerial vehicles, said system comprising:
    an elongated main body having a top surface, a bottom surface, a front surface, a rear surface, a first side, a second side, and a central aperture;
    a first landing unit that is connected to the main body adjacent to the first side by a first connection assembly;
    a second landing unit that is connected to the main body adjacent to the second side by a second connection assembly; and
    a pair of electromechanical actuators that are secured along the main body, said actuators being in communication with each of the first and second connection assemblies, wherein the pair of electromechanical actuators are configured to selectively transition the first landing unit and the second landing unit between an extended orientation and a retracted orientation, the pair of electromechanical actuators comprising a telescoping piston configured to move from a first position to a second position and back to the first position.

2. The system of claim 1, wherein the pair of electromechanical actuators comprise a telescoping piston, wherein the landing units are substantially parallel with the telescoping piston when the landing units are in a retracted orientation.

3. The system of claim 1, wherein the pair of electromechanical actuators comprise a telescoping piston configured to exert a pulling force in a first direction and a pushing force in a second direction that is opposite the first direction.

4. The system of claim 3, wherein the landing units transition to a extended orientation when the telescoping piston exerts the pulling force, and
wherein the landing units transition to a retracted orientation when the telescoping piston exerts the pushing force.

5. The system of claim 1, wherein the first landing unit and the second landing unit each comprise:
a pair of parallel-oriented struts that are connected to one of the connection assemblies along a first end; and
an elongated landing skid that is connected to a second end of the pair of parallel-oriented struts.

6. The system of claim 5, further comprising:
a plurality of rollers that are disposed along the elongated landing skid of each of the first and second landing units.

7. The system of claim 1, wherein the pair of electromechanical actuators are positioned adjacent to the first and second landing units along a horizontal axis of the system.

8. The system of claim 7, wherein the pair of electromechanical actuators are positioned parallel with a major axis of the main body, and perpendicular to a major axis of the first and second landing units when the first and second landing units are in the extended orientation.

9. The system of claim 8, wherein the pair of electromechanical actuators are positioned parallel to a major axis of the first and second landing units when the first and second landing units are in the retracted orientation.

10. The system of claim 9, wherein the connection assemblies transition the landing units to the extended orientation upon receiving a pulling force from the telescoping piston, and wherein the connection assemblies transition the landing units to the retracted orientation upon receiving a pushing force from the telescoping piston.

11. The landing system of claim 10, further comprising:
a pair of rigid handles that are positioned across the central aperture and extend between the front and back surfaces of the main body,
wherein the pair of handles are positioned adjacent to each of the pair of electromechanical actuators and include a major axis that is oriented perpendicular to a major axis of the pair of electromechanical actuators,
said handles being configured to provide torsional strength to the main body during operation of the electromechanical actuators.

12. The landing system of claim 1, wherein the main body includes a plurality of connectors, said connectors being positioned so as to engage complementary connectors on a bottom surface of a heavy-lift unmanned aerial vehicle.

13. The landing system of claim 12, wherein the central aperture includes a shape that is suitable for receiving a belly hook that is secured onto the bottom surface of the heavy-lift aerial vehicle.

14. The landing system of claim 13, further comprising:
a pair of handles that are positioned across the central aperture and extend between the front and back surfaces of the main body.

15. The landing system of claim 14, wherein the handles are positioned so as to be located along each side of the heavy-lift unmanned aerial vehicle secured to the main body.

16. The landing system of claim 14, wherein the pair of handles are positioned adjacent to each of the pair of electromechanical actuators, and
a major axis of the pair of handles are oriented perpendicular to a major axis of the pair of electromechanical actuators,
said handles being configured to provide torsional strength to the main body during operation of the electromechanical actuators.

* * * * *